(12) United States Patent
McCarthy et al.

(10) Patent No.: US 12,017,135 B2
(45) Date of Patent: Jun. 25, 2024

(54) ELECTRIC VEHICLE HUB

(71) Applicant: Milton, LLC, Ponce Inlet, FL (US)

(72) Inventors: Scott McCarthy, Ponce Inlet, FL (US); Logan McCarthy, Ponce Inlet, FL (US)

(73) Assignee: Milton, LLC, Ponce Inlet, FL (US)

( * ) Notice: Subject to any disclaimer, the term of this patent is extended or adjusted under 35 U.S.C. 154(b) by 499 days.

(21) Appl. No.: 17/357,333

(22) Filed: Jun. 24, 2021

(65) Prior Publication Data

US 2022/0409984 A1 Dec. 29, 2022

(51) Int. Cl.
| | |
|---|---|
| *A63C 17/01* | (2006.01) |
| *A63C 17/12* | (2006.01) |
| *A63C 17/22* | (2006.01) |
| *A63C 17/26* | (2006.01) |

(52) U.S. Cl.
CPC .......... *A63C 17/223* (2013.01); *A63C 17/016* (2013.01); *A63C 17/12* (2013.01); *A63C 17/26* (2013.01)

(58) Field of Classification Search
CPC ...... A63C 17/222; A63C 17/016; A63C 17/12
See application file for complete search history.

(56) References Cited

U.S. PATENT DOCUMENTS

| | | |
|---|---|---|
| 1,123,686 A | 1/1915 | Bondurant et al. |
| 4,991,861 A | 2/1991 | Carn et al. |
| 7,484,741 B2 | 2/2009 | Kay, III |
| 11,325,020 B1* | 5/2022 | McCarthy ............... A63C 17/12 |
| 2001/0030404 A1 | 10/2001 | Liu |
| 2003/0122334 A1 | 7/2003 | Laporte |
| 2004/0155421 A1 | 8/2004 | Paddock |
| 2005/0230930 A1 | 10/2005 | Chung |
| 2005/0280231 A1 | 12/2005 | Gallipoli |
| 2006/0226620 A1 | 10/2006 | Cole |
| 2007/0246308 A1 | 10/2007 | Sauve et al. |
| 2011/0042913 A1 | 2/2011 | Landau |
| 2013/0175790 A1 | 7/2013 | Wurst |
| 2016/0107070 A1 | 4/2016 | Middleton |
| 2017/0056756 A1* | 3/2017 | Pikulski ............... A63C 17/016 |

(Continued)

FOREIGN PATENT DOCUMENTS

| | | |
|---|---|---|
| DE | 10215278 A1 | 10/2003 |
| EP | 0933103 A2 | 8/1999 |

(Continued)

*Primary Examiner* — Brian L Swenson
(74) *Attorney, Agent, or Firm* — Meunier Carlin & Curfman LLC

(57) ABSTRACT

A wheel hub configured to be used with an electric vehicle. The wheel hub includes a hollow cylindrical body, a direct drive motor, a hollow axle, a battery, and a tire. The hollow cylindrical body includes a first end surface and a second end surface that is axially opposite and spaced apart from the first end surface. The direct drive motor is disposed within the hollow cylindrical body and is configured to rotate the cylindrical body about a central axis of the motor. The hollow axle has a central axis that is coaxial with the motor central axis and is at least partially disposed within the cylindrical body. The battery is disposed within the hollow cylindrical body and is in electrical communication with the direct drive motor. The tire is fixedly coupled and disposed on an external surface of the hollow cylindrical body.

20 Claims, 16 Drawing Sheets

(56) References Cited

U.S. PATENT DOCUMENTS

| | | | |
|---|---|---|---|
| 2017/0106739 A1* | 4/2017 | Gillett | G05D 1/0016 |
| 2017/0182398 A1 | 6/2017 | Garcia Elena | |
| 2019/0382072 A1 | 12/2019 | Allen | |
| 2023/0390630 A1* | 12/2023 | Mullet | A63C 17/12 |

FOREIGN PATENT DOCUMENTS

| | | | |
|---|---|---|---|
| GB | 2426462 A | 11/2006 | |
| WO | 2003095042 A2 | 11/2003 | |
| WO | 2004108231 A1 | 12/2004 | |

* cited by examiner

ELECTRIC VEHICLE HUB

BACKGROUND

Traditionally, electric vehicles and, specifically, electric skateboards have batteries located on the underside of the electric vehicle or electric skateboard. In some instances, the batteries can get damaged because of the vicinity in which the batteries lie to the force of the user and to possibly harsh environmental elements. Furthermore, the controls for the batteries and how the batteries are configured to interact with the wheels of the electric vehicle must be changed every time the batteries come into a different electric vehicle system.

Thus, there exists a need for a system that protects the battery while uniformly configuring the wheel and the battery of the electric vehicle.

SUMMARY

Various implementations include a wheel hub configured to be used with an electric vehicle. The wheel hub includes a hollow cylindrical body, a direct drive motor, a hollow axle, a battery, and a tire. The hollow cylindrical body includes a first end surface and a second end surface that is axially opposite and spaced apart from the first end surface. The direct drive motor is disposed within the hollow cylindrical body and is configured to rotate the cylindrical body about a central axis of the motor. The hollow axle has a central axis that is coaxial with the motor central axis and is at least partially disposed within the cylindrical body. The battery is disposed within the hollow cylindrical body and is in electrical communication with the direct drive motor. The tire is fixedly coupled and disposed on an external surface of the hollow cylindrical body.

In some implementations, the cylindrical body is watertight.

In some implementations, the wheel hub further includes a power button that is disposed within a first end of the hollow axle, the button being in electrical communication with the direct drive motor and is configured to turn the direct drive motor on or off.

In some implementations, the wheel hub further includes a charge port that is disposed within a second end of the hollow axle, the charge port being in electrical communication with the battery.

In some implementations, the hollow cylindrical body includes an inner surface, and the battery is disposed within the hollow cylindrical body such that a portion of the battery is adjacent a portion of the inner surface.

In some implementations, the battery includes a first battery and a second battery, the first battery being disposed between the first end surface of the cylindrical body and the direct drive motor, and the second battery being disposed between the second end surface and the direct drive motor.

In some implementations, the hollow cylindrical body includes an inner surface, and the first battery and second battery have a semi annular shaped cross section as viewed in a plane that is perpendicular to the central axis of the motor, each of the first and the second battery has a flat surface and a curved surface. In some implementations, the first battery and the second battery are disposed within the hollow cylindrical body such that at least a portion of the curved surfaces of the first battery and the second battery are adjacent a portion of the inner surface.

In some implementation, the battery further includes a battery management system, the battery management system being coupled to the flat surface of the first battery and/or the second battery.

In some implementations, the wheel hub further includes a remote control receiver disposed within the hollow cylindrical body, the remote control receiver being in electrical communication with the direct drive motor.

In some implementations, the tire includes an airless tire.

In some implementations, the first end surface and/or the second end surface defines a plurality of windows, and the wheel hub further including LED lights disposed within the hollow cylindrical body such that the LED lights are visible through at least one of the plurality of windows.

In some implementations, the LED lights include a first set of LED lights and a second set of LED lights, the first set of LED lights being disposed within the hollow cylindrical body and adjacent the windows defined in the first end surface, and the second set of LED lights being disposed within the hollow cylindrical body adjacent the windows defined in the second end surface.

In some implementations, the first set of LED lights includes a first plate, and the second set of LED lights includes a second plate, the first and second plate being disposed on the hollow axle.

Various implementations include an electric skateboard system. The system includes a first wheel hub and a second wheel hub and a board having a longitudinal axis, a first end and a second end opposite and spaced apart from the first end along the longitudinal axis. The first wheel hub and second wheel hub each include a hollow cylindrical body, a direct drive motor, a hollow axle, a battery, and a tire. The hollow cylindrical body includes a first end surface and a second end surface that is axially opposite and spaced apart from the first end surface. The direct drive motor is disposed within the hollow cylindrical body and is configured to rotate the cylindrical body about a central axis of the motor. The hollow axle has a central axis that is coaxial with the motor central axis and is at least partially disposed within the cylindrical body. The battery is disposed within the hollow cylindrical body and is in electrical communication with the direct drive motor. The tire is fixedly coupled and disposed on an external surface of the hollow cylindrical body. In some implementations, the first wheel hub is coupled to the board adjacent the first end of the board, and the second wheel hub is coupled to the board adjacent the second end of the board. In some implementations, the first wheel hub is in electrical communication with the second wheel hub, and the first wheel hub and the second wheel hub are watertight.

In some implementations, the system further includes an RF receiver.

In some implementations, the system further includes a remote control, the remote control being configured to communication with the RF receiver to power the first wheel hub and/or second wheel hub on/off and/or change the speed of the direct drive motor of the first wheel hub and/or second wheel hub.

In some implementation, the RF receiver is a Bluetooth receiver, and the remote control is a Bluetooth remote control.

In some implementations, the system further includes a power button, the button being disposed within a first end of the hollow axle of the first wheel hub or the second wheel hub, the button being in electrical communication with the direct drive motor of the first wheel hub or the second wheel hub and is configured to turn the direct drive motor of the first wheel hub or the second wheel hub on or off.

In some implementations, the system further includes a charge port, the charge port being disposed within a first end or a second end of the hollow axle of the first wheel hub or the second wheel hub and in electrical communication with the battery of the first wheel hub and the battery of the second wheel hub.

In some implementations, the tire of the first wheel hub includes an airless tire, and wherein the tire of the second wheel hub includes an airless tire.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein provide for a wheel hub configured to be used with an electric vehicle. The wheel hub is hollow and includes a direct drive motor disposed within the wheel hub that drives the wheel hub internally. The wheel hub further includes the batteries and controls disposed within the wheel hub such that the batteries are configured to work with the dimensions of the wheel hub and such that the batteries are protected from the elements or direct force from the user mounting the electric vehicle or skateboard.

Various implementations include a wheel hub configured to be used with an electric vehicle. The wheel hub includes a hollow cylindrical body, a direct drive motor, a hollow axle, a battery, and a tire. The hollow cylindrical body includes a first end surface and a second end surface that is axially opposite and spaced apart from the first end surface. The direct drive motor is disposed within the hollow cylindrical body and is configured to rotate the cylindrical body about a central axis of the motor. The hollow axle has a central axis that is coaxial with the motor central axis and is at least partially disposed within the cylindrical body. The battery is disposed within the hollow cylindrical body and is in electrical communication with the direct drive motor. The tire is fixedly coupled and disposed on an external surface of the hollow cylindrical body.

Various implementations include an electric skateboard system. The system includes a first wheel hub and a second wheel hub as described above and a board having a longitudinal axis, a first end and a second end opposite and spaced apart from the first end along the longitudinal axis. The first wheel hub is coupled to the board adjacent the first end of the board, and the second wheel hub is coupled to the board adjacent the second end of the board. In some implementations, the first wheel hub is in electrical communication with the second wheel hub, and the first wheel hub and the second wheel hub are watertight.

Figure 1:
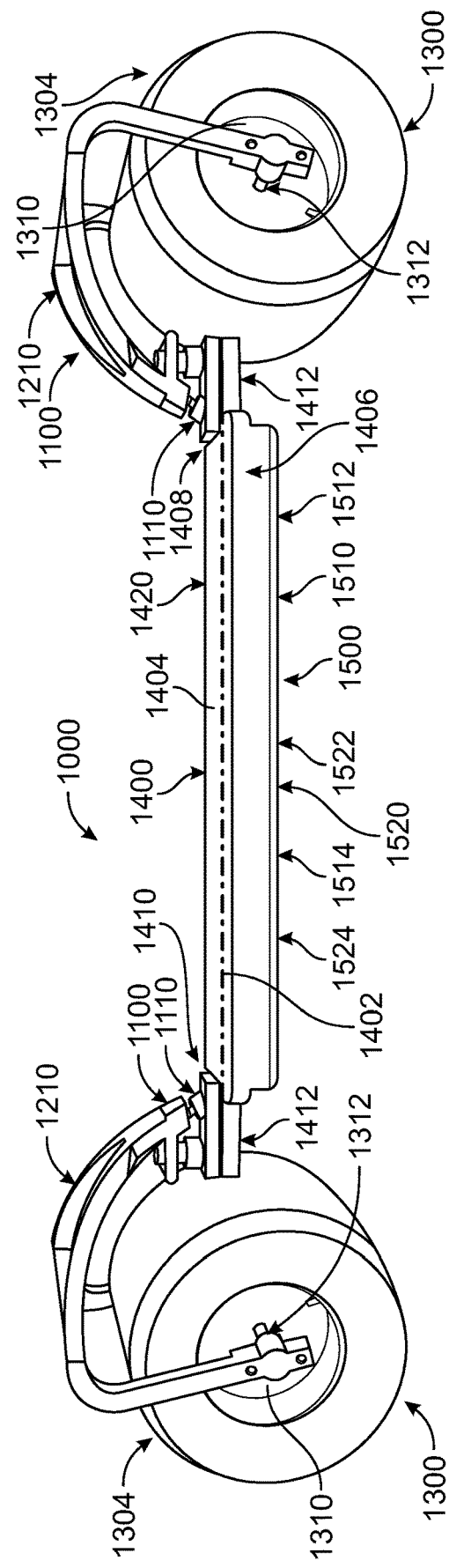
FIG. 1 is a side view of an electric skateboard, in accordance with one implementation.
Figure 2:
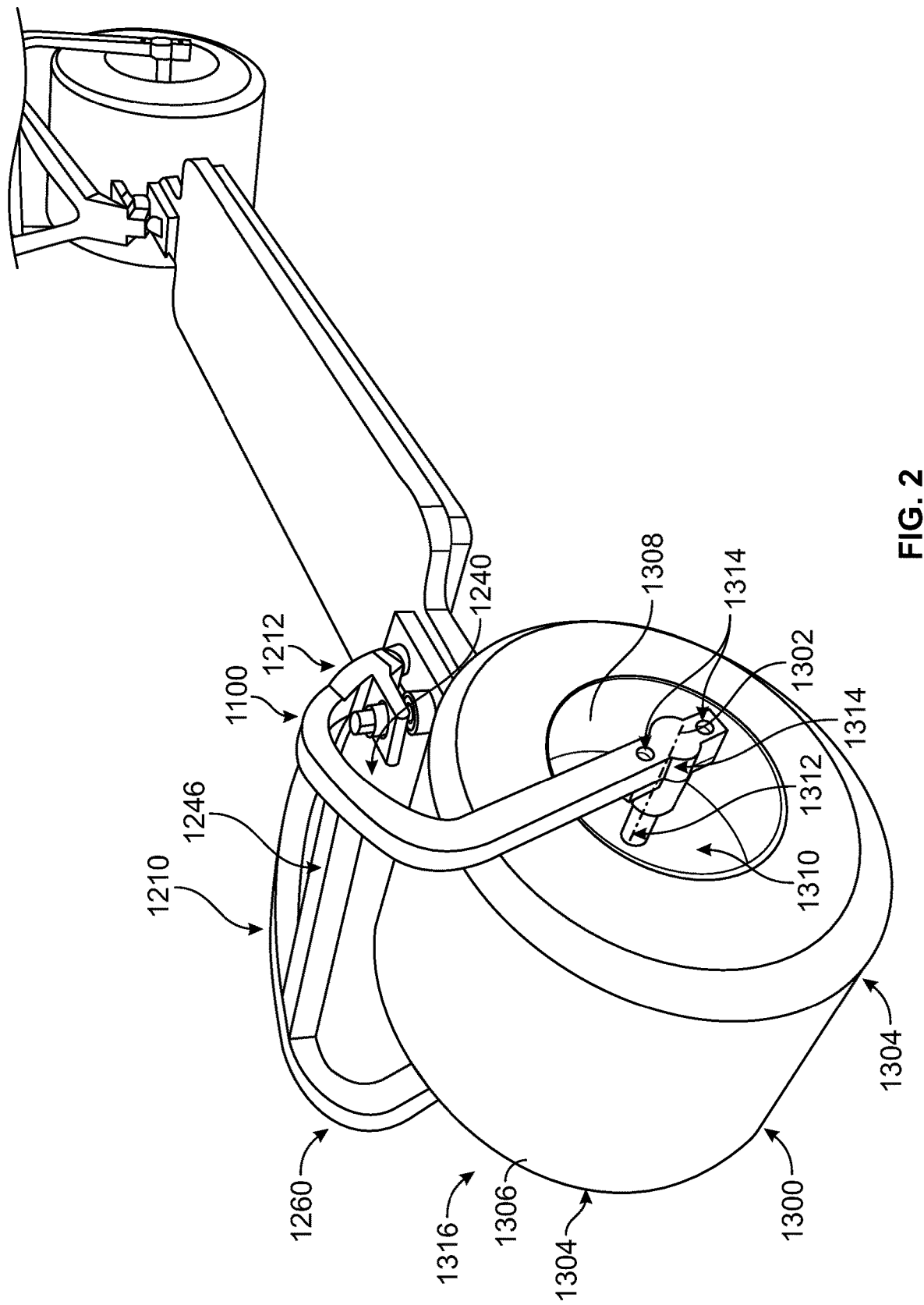
FIG. 2 is a perspective view of the electric skateboard of FIG. 1.

FIGS. 1 and 2 show an electric skateboard 1000 that includes two trucks 1100, two wheels 1300, and a board 1400. Each truck 1100 includes a baseplate 1110, a pivot cup 1130, a hanger 1210, a kingpin 1290, two resilient bushings 1296, 1297, and a nut 1298.

Figure 3:
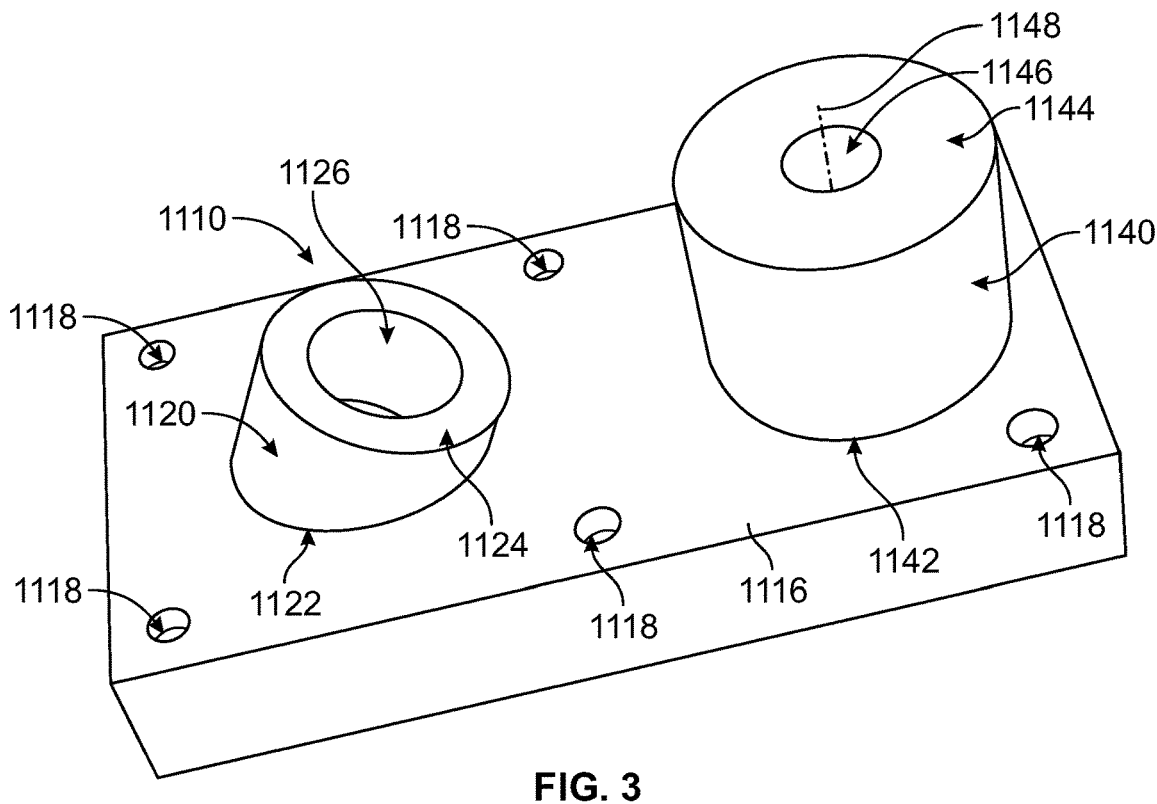
FIG. 3 is a detailed perspective view of the top of a baseplate of the electric skateboard of FIG. 1.
Figure 4:
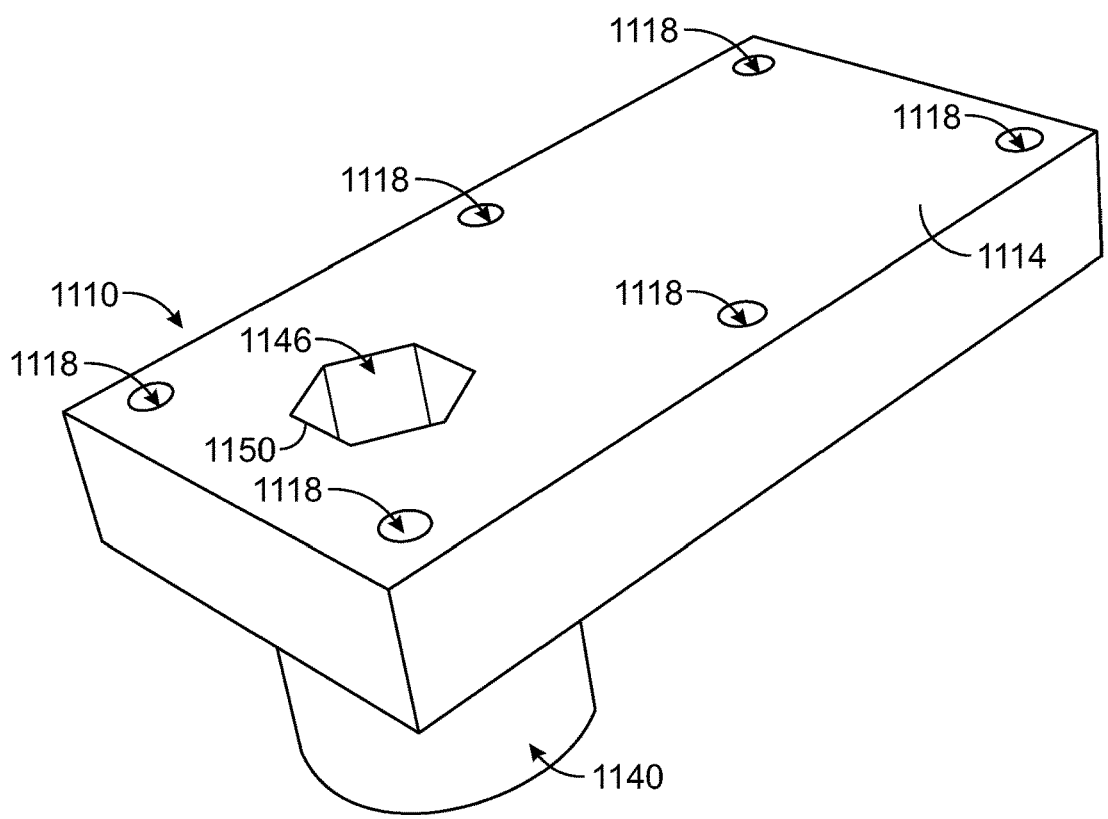
FIG. 4 is a detailed perspective view of the bottom of the baseplate of FIG. 3.

The baseplate 1110 is shown in FIGS. 3 and 4. The baseplate 1110 includes a mounting block 1112, a pivot cup protrusion 1120, and a kingpin protrusion 1140. The mounting block 1112 has a first surface 1114 (also referred to herein as "the mounting surface") and a second surface 1116 opposite and spaced apart from the mounting surface 1114. The mounting surface 1114 shown in FIGS. 3 and 4 defines six fastener openings 1118 that extend from the mounting surface 1114 to the second surface 1116, but in other implementations, the mounting surface defines any number of fastener openings.

The pivot cup protrusion 1120 has a first end 1122 and a second end 1124 spaced apart from the first end 1122. The first end 1122 of the pivot cup protrusion 1120 is integrally coupled to the second surface 1116 of the mounting block 1112. The surface of the second end 1124 of the pivot cup protrusion 1120 defines a pivot cup opening 1126 which extends partially through the pivot cup protrusion 1120. The pivot cup 1130 is disposed within the pivot cup opening 1126 of the pivot cup protrusion 1120.

The pivot cup 1130 is a hollow sleeve defining an opening at one end. The pivot pin 1218 is disposed within the opening of the pivot cup 1130, as discussed below. The pivot cup 1130, shown best in FIG. 5, comprises urethane, but in other implementations, the pivot cup comprises urethane, rubber, plastic, or any combination thereof.

Although the surface of the second end 1124 of the pivot cup protrusion 1120 shown in FIGS. 3 and 4 is at a 30-degree angle relative to second surface 1116 of the mounting block 1112, in other implementations, the surface of the second end of the pivot cup protrusion is angled relative to the second surface of the mounting block at any angle between 0 and 180 degrees. And although the pivot cup opening 1126 is also at a 30-degree angle relative to the second surface 1116 of the mounting block 1112, in other implementations, the angle of the pivot cup opening can be the same or different than the angle of the first end of the pivot cup protrusion and/or at any angle between 0 and 180 degrees relative to the second surface of the mounting block.

Although the pivot cup opening 1126 shown in FIGS. 3 and 4 extends only partially through the pivot cup protrusion 1120, in other implementations, the pivot cup opening can extend to the first pivot cup protrusion end, partially into the mounting block, or through the mounting block.

The kingpin protrusion 1140 has a first end 1142 and a second end 1144 opposite and spaced apart from the first end 1142 of the kingpin protrusion 1140. The first end 1142 of the kingpin protrusion 1140 is integrally coupled to the second surface 1116 of the mounting block 1112 such that the second end 1144 of the kingpin protrusion 1140 is opposite and spaced apart from the second surface 1116 of the mounting block 1112. The surface of the second end 1144 of the kingpin protrusion 1140 defines a first kingpin opening 1146. The first kingpin opening 1146 has a central axis 1148 and extends through the kingpin protrusion 1140, through the mounting block 1112, and to the mounting surface 1114. The mounting surface 1114 of the mounting block 1112 defines a hexagonal recess 1150 around the first kingpin opening 1146 that extends partially through the mounting block 1112.

In some implementations, the inner surface of the first kingpin opening includes a plurality of radially inwardly extending protrusions circumferentially spaced around the first opening that are engageable with a plurality of corresponding radially outwardly extending kingpin protrusions. In other implementations, the inner surface of the first kingpin opening includes a plurality of threads such that a kingpin can be threaded into the first kingpin opening to couple the kingpin to the baseplate. In other implementations, the kingpin protrusion is not integrally coupled to the mounting block and is mechanically coupled to the mounting block with fasteners or any other physical coupling capable of securing the kingpin protrusion on the mounting block such that the kingpin protrusion is able to support the kingpin and couple the hanger to the mounting block. In other implementations, the pivot cup protrusion is not integrally coupled to the mounting block and is mechanically coupled to the mounting block with fasteners or any other physical coupling capable of retaining the pivot cup and withstanding the forces applied to the pivot cup protrusion in use.

Figure 6:
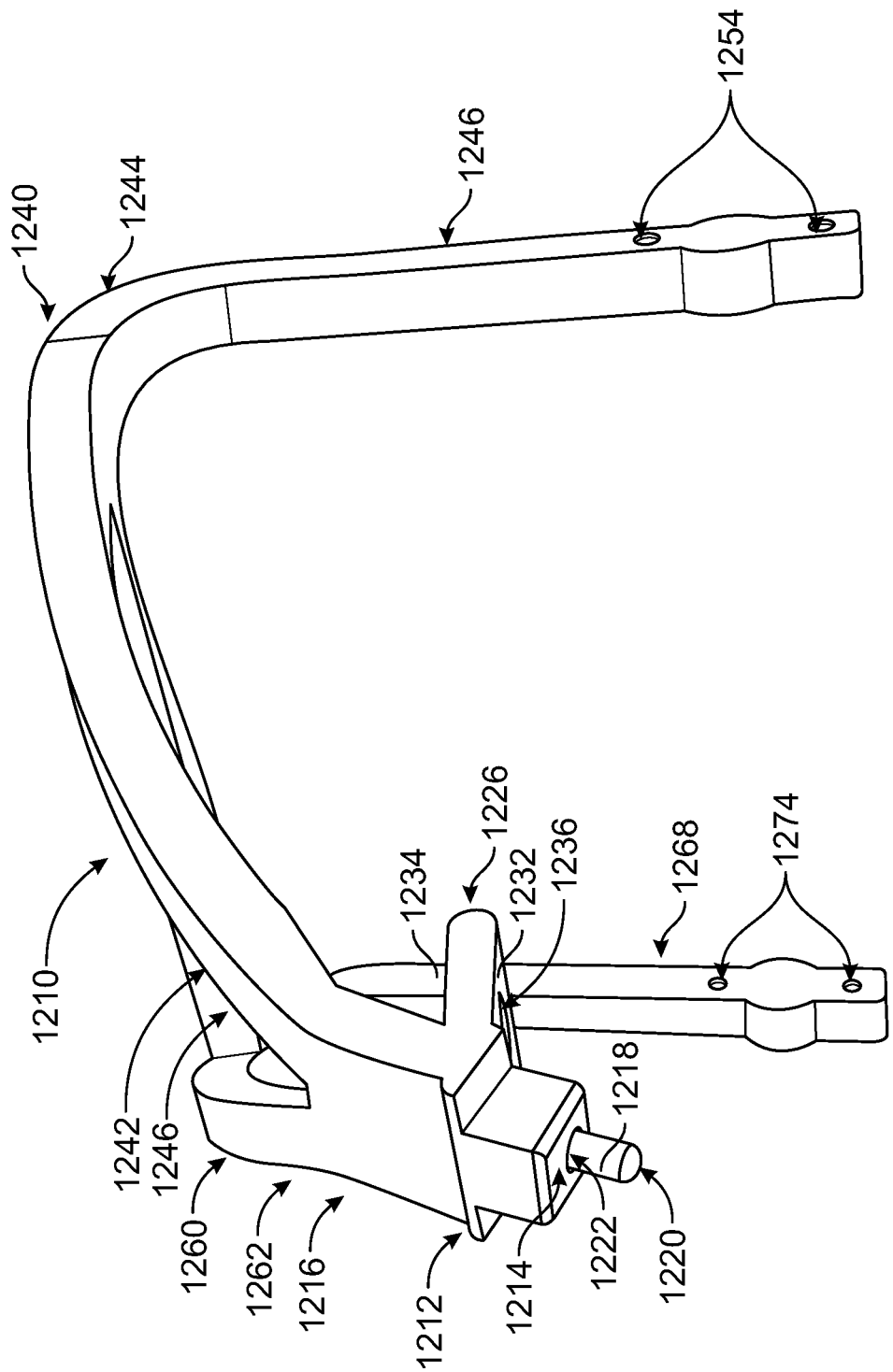
FIG. 6 is a perspective view of the top of a hanger of the electric skateboard of FIG. 1.
Figure 7:
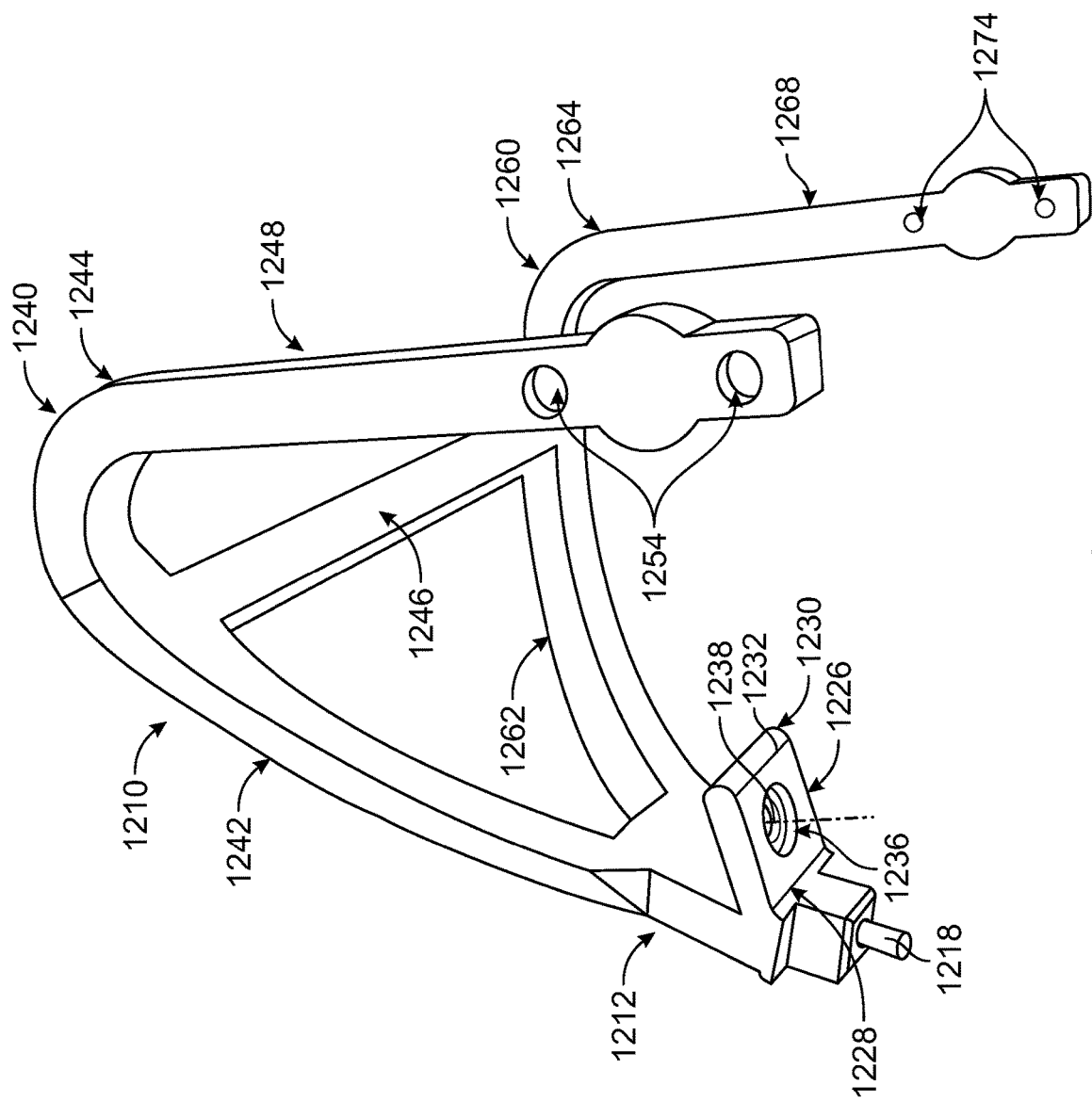
FIG. 7 is a perspective view of the bottom of the hanger of FIG. 6.
Figure 8:
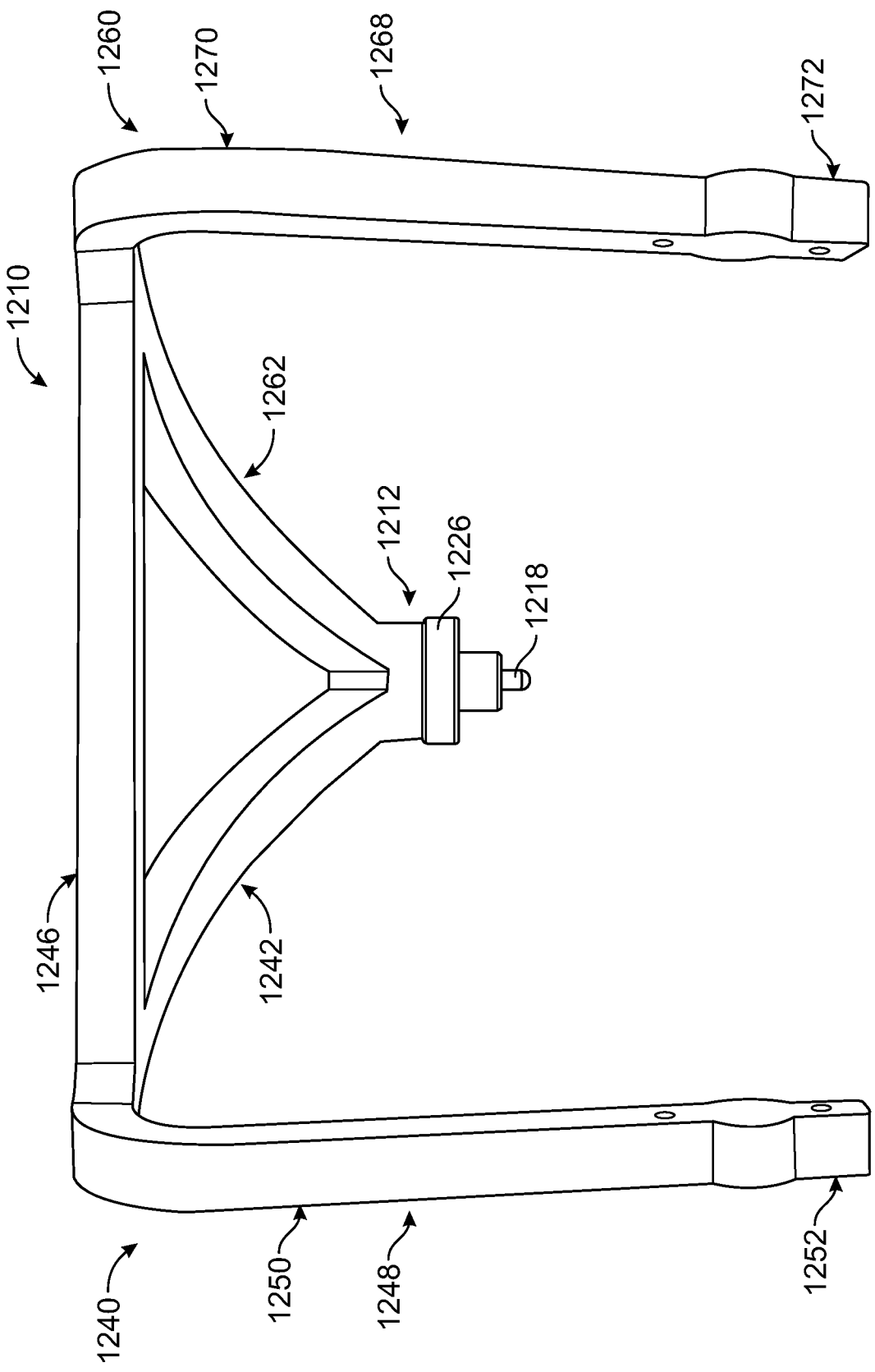
FIG. 8 is a front view of the hanger of FIG. 6.

FIGS. 6-8 show the hanger 1210. The hanger 1210 includes a main portion 1212, a pivot pin 1218, a first branch 1240, a second branch 1260, and a central plane 1280. The main portion 1212 has a first main portion end 1214 and a second main portion end 1216 opposite and spaced apart from the first main portion end 1214. The pivot pin 1218 extends from the first main portion end 1214.

The pivot pin 1218 is a cylindrical protrusion and has a first pivot pin end 1220 and a second pivot pin end 1222 opposite and spaced apart from the first pivot pin end 1220. The second pivot pin end 1222 is integrally coupled and formed to the first main portion end 1214. As seen in FIGS. 6-8, the first pivot pin end 1220 is removably and pivotably disposable within the pivot cup 1130. The first pivot pin end 1220 is pivotable about a pivot point 1224 when the first pivot pin end 1220 is disposed within the pivot cup 1130. A user can carve and turn the skateboard 1000 by shifting the user's weight on the skateboard 1000 to cause the hanger 1210 to pivot about the pivot point 1224 relative to the baseplate 1110 and board 1400.

The main portion 1212 further includes a main portion protrusion 1226 on a surface that extends between the first main portion end 1214 and the second main portion end 1216. The main portion protrusion 1226 has a first end 1228 and a second end 1230 opposite and spaced apart from the first end 1228. The first end 1228 of the main portion protrusion 1226 is integrally coupled to the surface of the main portion 1212 that extends between the first main portion 1214 and the second main portion end 1216. The main portion protrusion 1226 also has a first surface 1232 and a second surface 1234 opposite and spaced apart from the first surface 1232. Both the first surface 1232 and the second surface 1234 extend between the first end 1228 and the second end 1230 of the main portion protrusion 1226 at a 120-degree angle relative to the surface of the main portion 1212.

The first surface 1232 of the main portion protrusion 1226 defines a second kingpin opening 1236. The second kingpin opening 1236 has a central axis 1238 and extends from the first surface 1232 of the main portion protrusion 1226 to the second surface 1234 of the main portion protrusion 1226. When the pivot pin 1218 is disposed within the pivot cup 1130, the first kingpin opening 1146 and the second kingpin opening 1236 are alignable such that the central axis of the first kingpin opening 1146 and the central axis of the second kingpin opening 1236 are positionable coaxially. When the central axis of the first kingpin opening 1146 and the second kingpin opening 1236 are coaxial, the kingpin 1290 is disposed within the first kingpin opening 1146 and the second kingpin opening 1236. As discussed below, the kingpin 1290 couples the hanger 1210 to the baseplate 110, and the pivot pin 1218 being disposed within the pivot cup 1130 keeps the hanger 1210 and baseplate 110 aligned.

The first and second branches of the hanger 1240,1260 extend from the second end 1216 of the main portion 1212. The pivot point 1224 of the pivot pin 1218 and the central axis of the second kingpin opening 1236 define the central plane 1280. The first and second branches 1240,1260 have substantially the same structure as each other and are substantially mirrored across the central plane 1280. Each of the first and the second branches 1240,1260 have a separate curved longitudinal axis, a first portion 1242,1262, a second portion 1248,1268 opposite the first portion 1242,1262, and a middle portion 1244,1264 disposed between the first portions 1242,1262 and second portions 1248,1268. The term "axis", as used herein, can mean any line including straight lines, curved lines, bent lines, or any other shaped lines.

Each first portion 1242,1262 initially extends from the second main portion end 1216 toward each middle portion 1244,1264 in a first direction having a vector component directed away from a plane defined by the mounting surface 1114. The first portions 1242,1262 of the first and second branches 1240,1260 extend equally away from the central plane 1280 as each first portion 1242,1262 extends in the first direction. Each first portion 1242,1262 shown in FIGS. 6-8 extends from the second main portion end 1216 such that the first direction is at a 60-degree angle relative to the second surface 1234 of the main portion protrusion 1226, but in other implementations, the first portion extends from the second end of the main portion such that the first direction is at any angle between 0 and 90 degrees relative to the second surface of the main portion protrusion.

Each middle portion 1244,1264 is integrally disposed between each first portion 1242,1262 and each second portion 1248,1268. A brace 1246 extends between the middle portions 1244,1264 of the first and second branches 1240,1260.

Each second portion 1248,1268 is located opposite the respective branch from each first portion 1242,1262 and has a first end 1250, 1270 and a second end 1252, 1272 opposite and spaced apart from the first end 1250, 1270. The first end 1250, 1270 of each second portion 1248,1268 is integrally coupled to the middle portion 1244,1264. The first end 1250, 1270 of the second portion 1248, 1268 initially extends from the middle portion 1244,1264 to the second end 1252, 1272 of the second portion 1248,1268 in a second direction having a vector component directed toward the plane defined by the mounting surface 1114. As each second portion 1248,1268 extends in the second direction, the distance between each second portion 1248,1268 and the central plane 1280 stays substantially the same. The first portions 1242,1262 are closer to each other than the second portions 1248,1268 are to each other.

The second end 1252, 1272 of each second portion 1248,1268 defines an axle openings 1254, 1274 that extends through the second end 1252, 1272 of each second portion 1248,1268. Each axle opening 1254, 1274 is perpendicular to the central plane 1280. The axle openings 1254, 1274 of each of the first branch 1240 and second branch 1260 are axially aligned with each other and are disposed opposite the plane defined by the mounting surface 1114 from the middle portion 1244,1264 of their respective branches and are configured for mounting the hub motor 1310 and subsequently the wheels 1300 via fasteners. However, in some implementations, the axle openings are aligned with the plane defined by the mounting surface. In other implementations, the axle openings of each of the first and second branches are axially aligned with each other and are disposed on the same side of the plane defined by the mounting surface as the middle portion of their respective branches.

The first branch 1240 is hollow to allow wires to extend from the axle opening 1254, through the first branch 1240, and to the board 1400 and electronics compartment 1500, but in other implementations, both the first and second branches are hollow or both the first and second branches are not hollow.

The baseplate 1110 and hanger 1210 comprise aluminum, but in some implementations, the baseplate and/or hanger can comprise any material such as steel, titanium, any metal, any alloy, carbon fiber, a polymer, or any combination thereof. Although a brace extends between the middle portions of the first and second branches, in other implementations, any number of braces extend between the first portions, the middle portions, and/or the second portions of the first and second branches. In other implementations, two or more braces create an "X" shape. In some implementations, no braces are included. In other implementations, a fender is removably couplable to the top of the baseplate and/or hanger.

The kingpin 1290 is a bolt having a shaft 1291 and a head 1294. The shaft 1291 of the kingpin 1290 has a first kingpin shaft end 1292 and a second kingpin shaft end 1293 opposite and spaced apart from the first kingpin shaft end 1292. The head 1294 is a hex head and is coupled to the first kingpin shaft end 1292, and at least a portion of the second end of the kingpin shaft 1293 defines threads. The shaft 1291 of the kingpin 1290 is disposed within the first and second kingpin openings 1146, 1236 such that the head 1294 of the kingpin 1290 is disposed within the hexagonal recess 1148 and abuts the first kingpin opening 1146, and at least a portion of the threaded portion of the shaft 1291 extends through the second kingpin opening 1236. The head 1294 of the kingpin 1290 abuts the sides of the hexagonal recess 1148 such that the head 1294 of the kingpin 1290 is flush with or recessed below the mounting surface 1116 of the mounting block 1112. The diameter of the shaft 1291 of the kingpin 1290 is smaller than the diameter of the first and second kingpin openings 1146, 1236 to allow for movement between the shaft 1291 of the kingpin 1290 and the first and second kingpin openings 1146, 1236.

In some implementations, the entire outer surface of the shaft of the kingpin defines threads. In other implementations, the head of the kingpin is not a hex head and is any shape head. In other implementations, the outer surface of the head of the kingpin includes a plurality of radially extending kingpin protrusions circumferentially spaced around the outer surface of the head of the kingpin that are engageable with a plurality of corresponding radially extending kingpin protrusions on the inner surface of the first kingpin opening. In other implementations, the shaft of the kingpin includes a plurality of radially extending kingpin protrusions circumferentially spaced around the outer surface of the shaft of the kingpin that are engageable with a plurality of corresponding radially extending kingpin protrusions on the inner surface of the first and/or second kingpin opening.

Figure 5:
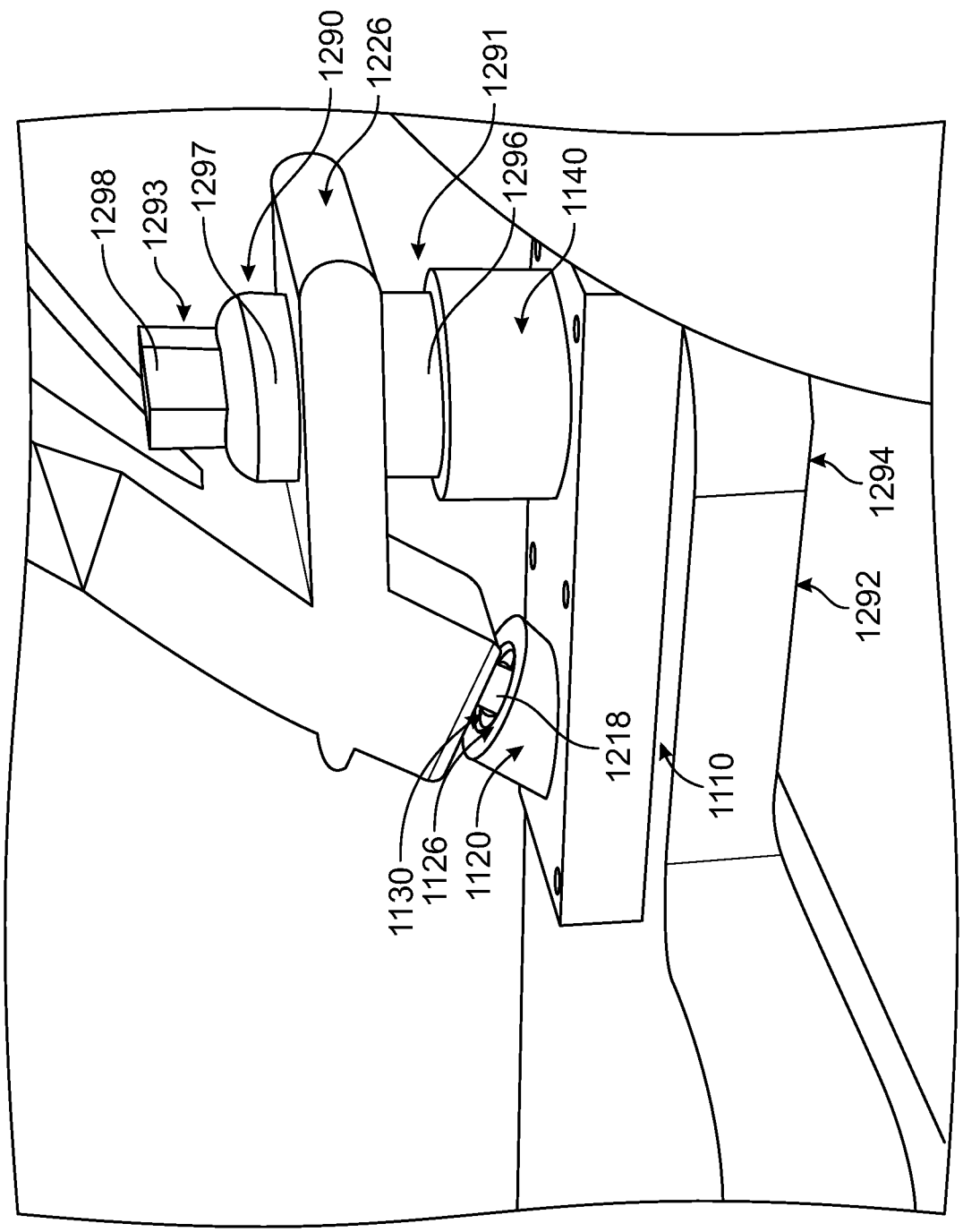
FIG. 5 is a detailed view of the baseplate and hanger of the electric skateboard of FIG. 1.

The first and second resilient bushings 1296, 1297 are annular shaped bodies having an opening. The kingpin 1290 extends through the openings defined by each of the first and second resilient bushings 1296, 1297. As shown in FIG. 5, the first resilient bushing 1296 is disposed between the second end 1144 of the kingpin protrusion 1140 and the first surface 1232 of the main portion protrusion 1226, and the second resilient bushing 1297 is disposed adjacent the second surface 1234 of the main portion protrusion 1226 such that the second resilient bushing 1297 is opposite the first resilient bushing 1296. The nut 1298 is threaded onto the threaded portion of the second end 1293 of the shaft 1291 of the kingpin 1290 adjacent a side of the second resilient bushing 1297 opposite the second surface 1234 of the main portion protrusion 1226. The nut 1298 and the kingpin 1290 secure the first resilient bushing 1296, main portion 1212, and second resilient bushing 1297 to the baseplate 1110. The resilient bushings 1296, 1297 have a degree of resiliency that allows for movement of the kingpin 1290 within the kingpin openings 1146, 1236 such that the hanger 1210 can move relative to the baseplate 1110 by compressing the resilient bushings 1296, 1297 as a user applies more weight to one side of the board 1400 than the other side of the board 1400. The degree of resiliency of the resilient bushings 1296, 1297 affects the amount of force a user must apply to one of the side of the board 1400 in order to cause the skateboard 1000 to turn.

The resilient bushings 1296, 1297 comprise plastic (ie. polyurethane), rubber, or any combination thereof. In some implementations, the resilient bushing is an annular, frusto-conical shape. In other implementations, at least a portion of the resilient bushing includes a step with a smaller outer diameter than the other portion of the resilient bushing. In some implementations, the kingpin, nut, and resilient bushing assembly includes only one resilient bushing or three or more resilient bushings. In some implementations, the kingpin, nut, and resilient bushing assembly further includes a locking device to prevent the nut from backing off of the threaded portion of the kingpin, such as locking washers, a nyloc nut, a jam nut, thread filler, or any other device known to prevent unintentional movement of the nut relative to the kingpin. In some implementations, the kingpin, nut, and resilient bushing assembly further includes one or more washers.

As previously mentioned, each truck 1100 includes axle openings 1254, 1274 for mounting a wheel 1300. Each wheel 1300 has a central axis 1302, an annular outer portion 1304, and a hub motor 1310. The annular outer portion 1304 has a radially outer surface 1306, and a radially inner surface

1308. The hub motor 1310 is disposed within the annular outer portion 1304 adjacent the radially inner surface 1308 of the wheel 1300 and includes an axle 1312 disposed along the central axis 1302 of the wheel 1300. The axle 1312 includes a first end 1314 and a second end 1316 opposite and spaced apart from the first end 1314. The wheel 1300 is rotatably coupled to the truck 1100 by coupling the first end 1314 and the second end 1316 of the axle 1312 to the axle openings 1254, 1274 of the second portions 1248, 1268 of the first and second branches 1240, 1260 of the hanger 1210 via fasteners such that the wheel 1300 is disposed between the second portions 1248, 1268 of the first and second branches 1240, 1260. The axle 1312 of the hub motor 1310 is fixedly coupled to the truck 1100 such that the rotational movement of the hub motor 1310 causes the annular outer portion 1304 of the wheel 1300 to rotate relative to the axle 1312 and truck 1100. In other implementations, the hub motor is not disposed within the annular outer portion of the wheel but is instead separately mounted to the truck or board to drive a rotatable axle and/or wheel either directly or indirectly through a transmission assembly.

The wheel 1300 has a diameter in the range of 10-13 inches, an outer surface width of 6-12 inches, and a rim diameter in the range of 4-8 inches. The hub motor 1310 has a power of 1,500 watts, but in some implementations, hub motors with a power ranging from 1,000 to 2,000 watts.

The board 1400 has a longitudinal axis 1402, a top surface 1404, a bottom surface 1406 opposite and spaced apart from the top surface 1404, a first end 1408, and a second end 1410 opposite and spaced apart from the first end 1408 along the longitudinal axis 1402. The top surface 1404 of the board 1400 defines a plurality of faster openings 1412 extending from the top surface 1404 to the bottom surface 1406. A first group of fastener openings 1412 defined by the board 1400 are located adjacent the first end 1408 of the board 1400, and a second group of fastener openings 1412 defined by the board 1400 are located adjacent the second end 1410 of the board 1400. Each of the first and second group of fastener openings 1412 defined by the board 1400 are alignable with the fastener openings 1118 defined by the baseplate 1110 of a truck 1100. The baseplate 1110 of the truck 1100 is coupled to the board 1400 with a plurality of fasteners 1414 extending through the aligned fastener openings in the baseplate and the first group of fastener openings 1412 in the board 1400. The baseplate 1110 of another truck 1100 is coupled to the board 1400 with a plurality of fasteners 1414 extending through the aligned fastener openings 1118 in the baseplate 1110 and the second group of fastener openings 1412 in the board 1400. The branches 1240, 1260 of each of the trucks 1100 extend beyond the first and second ends 1408, 1410 of the board 1400, respectively. When a user is on the top surface 1404 of the board 1400, the hanger 1210 of each of the trucks 1100 flexes slightly which allows for easier control.

The top surface 1404 of the board 1400 further includes a frictional coating 1420 that extends over the entirety of the top surface 1404 of the board 1400 to provide traction between the top surface 1404 of the board 1400 and a user when in use. The frictional coating 1420 is applied to the top surface 1404 of the board 1400 via an adhesive, but in other implementations, the frictional coating is integrally formed with the board.

In other implementations, the board further includes foot straps coupled to the top surface to secure the feet of a user when riding the skateboard. In other implementations, the board includes at least one foot strap that is integrally formed with the top surface of the board, mechanically coupled to the top surface of the board with fasteners, or any other physical coupling capable of coupling at least one foot strap to the top surface of the board such that the physical coupling can couple the feet of a user to the board and withstand any potential forces applied by the feet of the user during riding.

The board 1400 further includes an electronics compartment 1500 coupled to the bottom surface 1406 of the board 1400. The electronics compartment 1500 houses a battery system 1510 and a motor controller 1520. The battery system 1510 includes a 15S4P lithium ion battery pack 1512 and a battery management system 1514. The motor controller 1520 includes a dual motor controller 1522 and includes a radio frequency ("RF") module 1524 which receives radio signals from an external remote (not shown). The external remote transmits radio signals to the RF module 1524 on the motor controller 1520. The motor controller 1520 powers the hub motors 1310 depending on the radio signal from the remote. The remote is capable of transmitting a variety of radio signals that can vary the direction and speed at which the wheels rotate.

The battery system 1510 and motor controller 1520 are in electrical communication with each hub motor 1310. The wires connecting the battery system 1510 and motor controller 1520 to the hub motors 1310 are disposed within the hollow first branch 1240 of each truck 1100.

In other implementations, the battery and motor controller are housed within the board. In other implementations, the microcontroller includes a Bluetooth module that is in communication with an external Bluetooth remote. In other implementations, the microcontroller includes any type of transmitter or receiver that communicates using signals of any frequency or wavelength.

Figure 9:
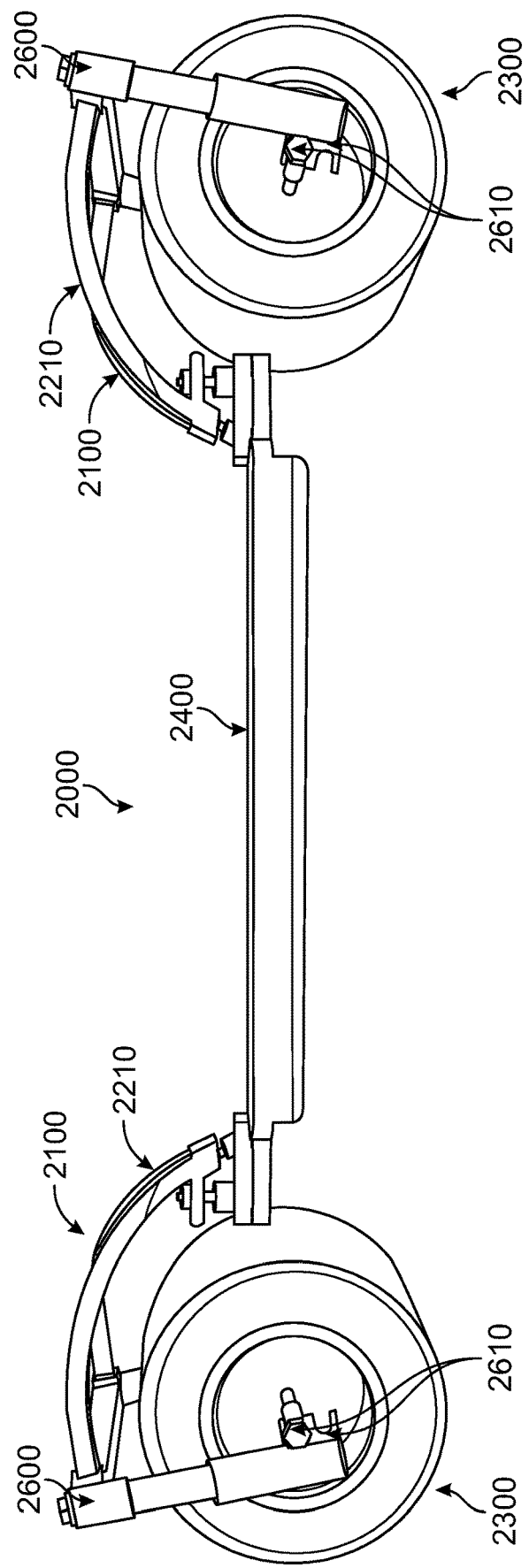
FIG. 9 is a side view of an electric skateboard, in accordance with another implementation.
Figure 10:
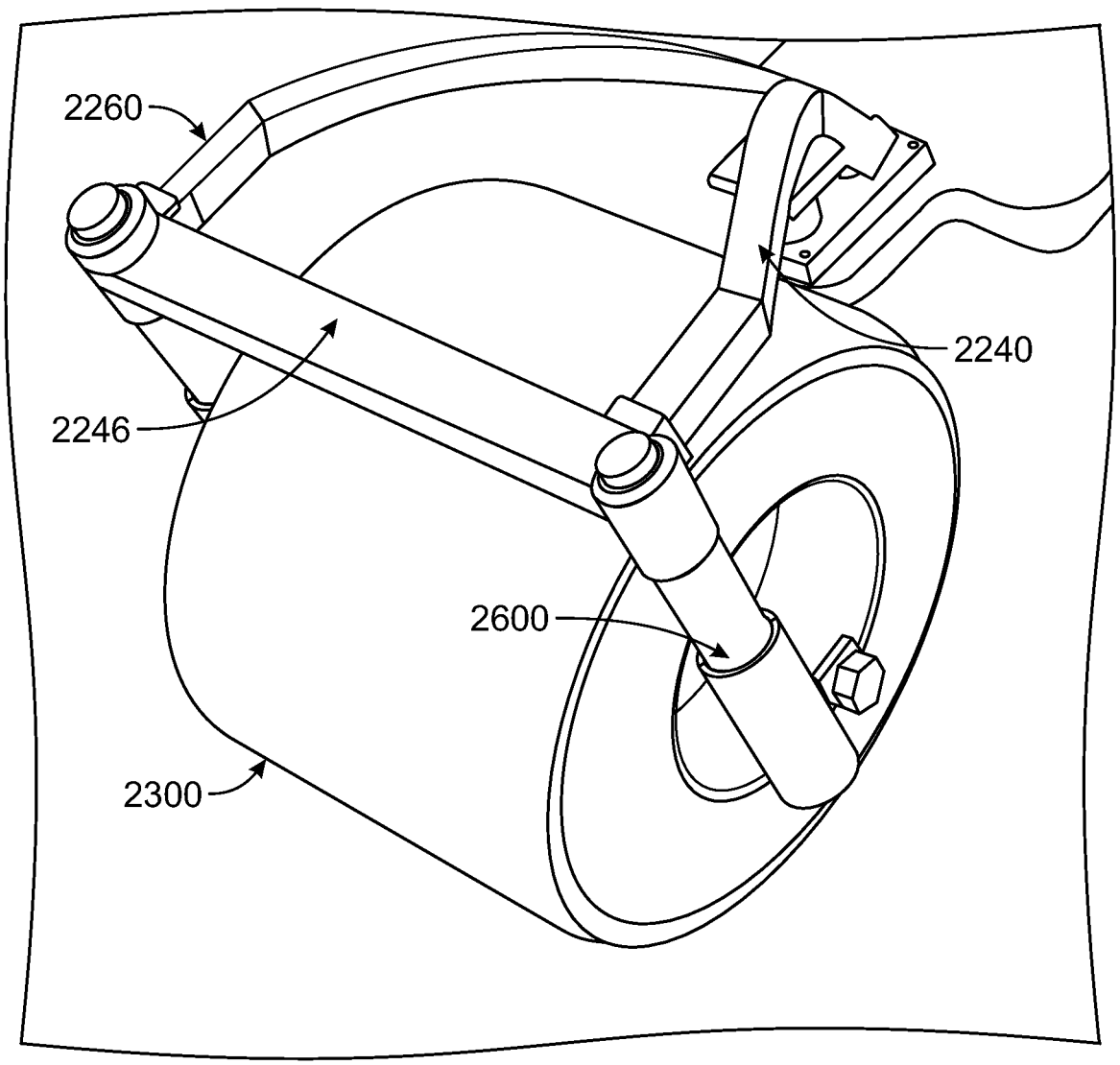
FIG. 10 is a magnified view of a truck and wheel of the electric skateboard of FIG. 9.
Figure 11:
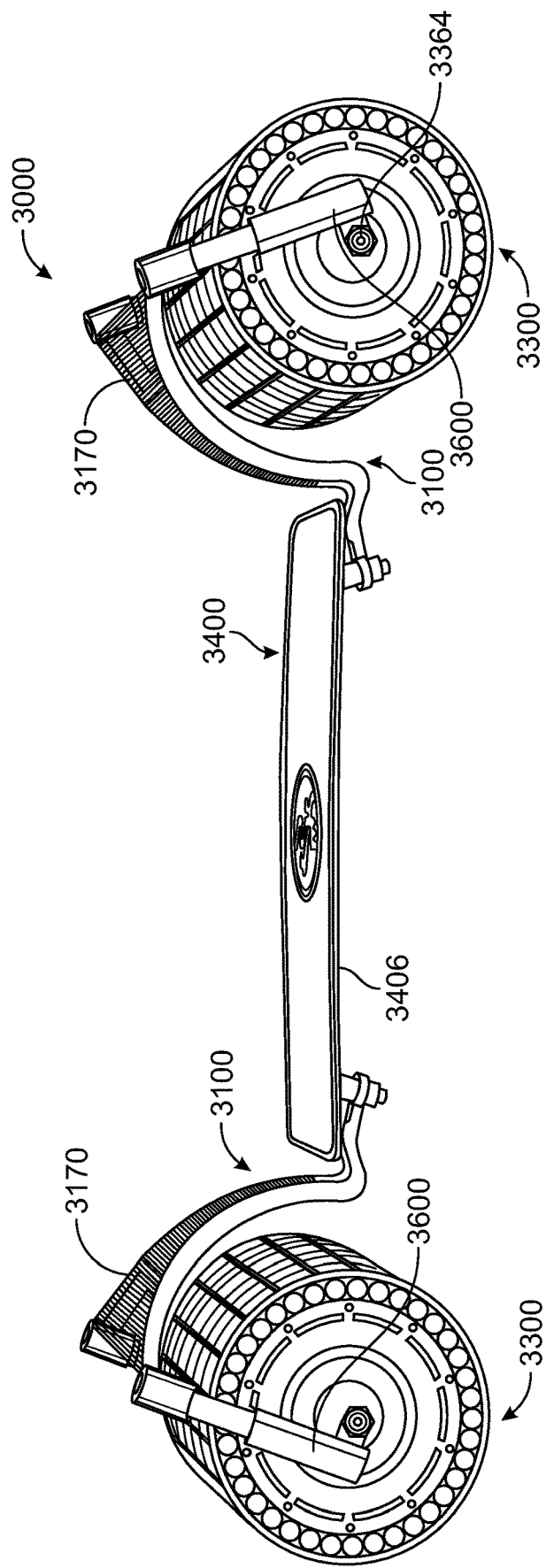
FIG. 11 is a side view of an electric skateboard, in accordance with one implementation.
Figure 12:
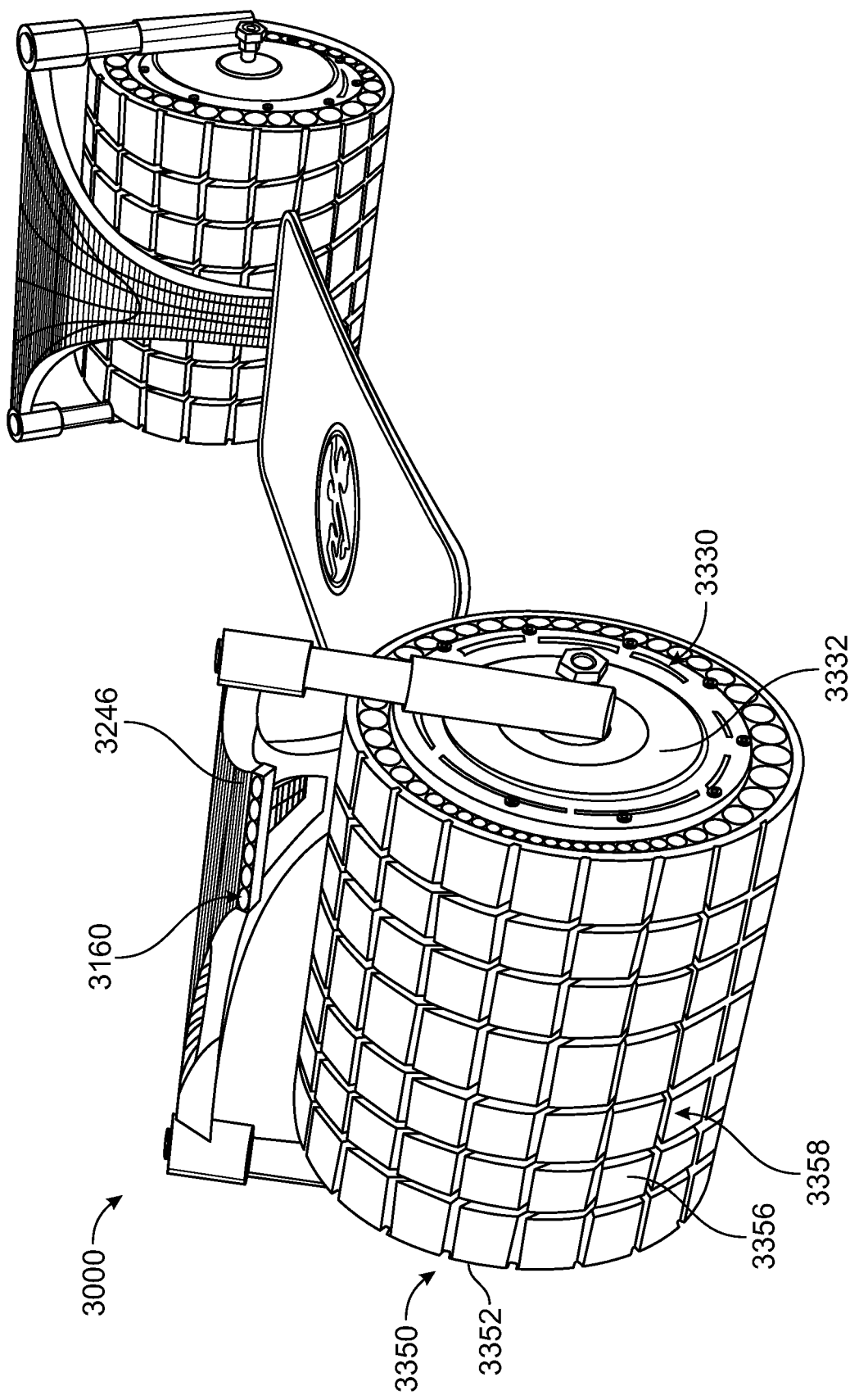
FIG. 12 is a perspective view of the electric skateboard of FIG. 11.
Figure 13:
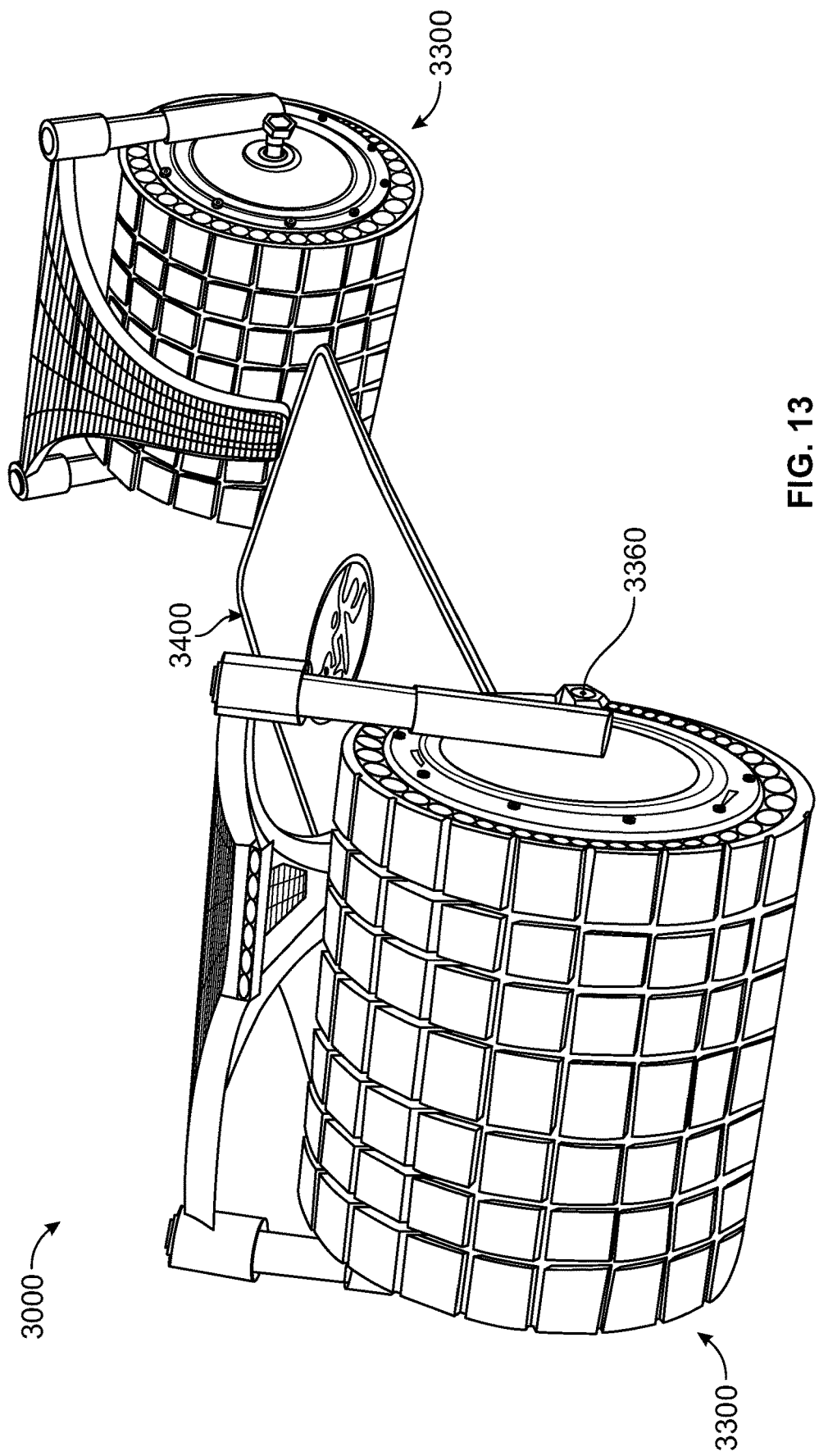
FIG. 13 is another perspective view of the electric skateboard of FIG. 11.
Figure 14:
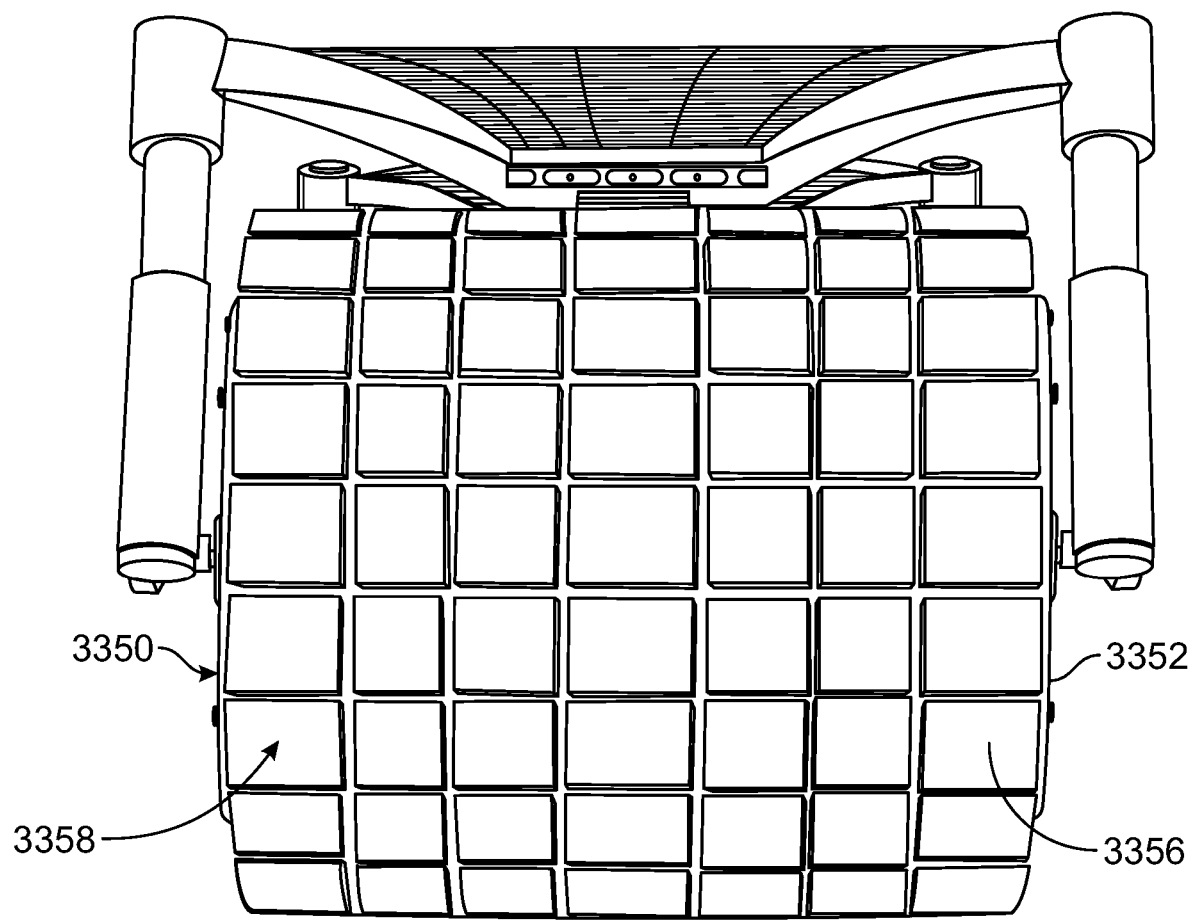
FIG. 14 is a front view of the electric skateboard of FIG. 11.

As shown in FIGS. 9 and 10, in another implementation, the skateboard 2000 further includes shock absorbers 2600. At least a portion of each second portion 2248, 2268 of each branch 2240, 2260 includes a shock absorber 2600. During use, the shock absorbers 2600 dampen the forces transferred from the ground to the board 2500 and help the wheels 2300 stay in contact with the ground. Each of the two shock absorbers 2600 define axle openings 2610 to allow for adjustability of the height of the trucks 2100. The shock absorbers 2600 shown in FIGS. 9 and 10 include air springs, but in other implementations, the shock absorbers include air shocks, coil shocks, or any shock absorber capable of stabilizing the skateboard 2000.

In other implementations, the shock absorber replaces the entire second portion of each of the branches and defines the axle openings. In other implementations, at least a portion of the middle portions of each of the branches includes a shock absorber. In other implementations, the shock absorber replaces the entire middle portion and second portion of each branch.

In other implementations, the electric skateboard includes wheel hubs and/or trucks that attach to the bottom of the board. FIGS. 11-14 illustrate one such implementation of an electric skateboard 3000 that includes wheel hubs 3300 and trucks 3100 that attach to the bottom 3406 of the board 3400. While the wheel hubs are shown with an electric skateboard, it is to be appreciated that the wheel hubs can be used with an electric vehicle.

Each of the wheel hubs 3300 include a hollow cylindrical body 3330, a tire 3350, a direct drive motor 3310, a hollow axle 3312, and a battery 3370. The wheel hubs 3300 of the electrical skateboard 3000 of FIGS. 11-14 are shown in detail in FIGS. 15-17 and are substantially similar except for the differences discussed below.

The hollow cylindrical body 3330 includes a first end surface 3332, a second end surface 3334 that is axially opposite and spaced apart from the first end surface 3332, an external surface 3340, and an inner surface 3342. The first end surface 3332 and the second end surface 3334 of the hollow cylindrical body 3330 each define a plurality of windows 3336 and an axle opening 3338. In the implementation shown in FIG. 11, the first end surface 3332 and the second end surface 3334 are separately formed from the hollow cylindrical body 3330 and are coupled to the hollow cylindrical body 3330 through a plurality of fasteners 3344 (e.g., bolts) and sealant such that the first end surface 3332 and the second end surface 3334 are watertight and fixedly coupled to the hollow cylindrical body 3330. In other implementations, the first end surface and the second end surface are integrally formed with the hollow cylindrical body. And, in other implementations, one of the first end surface or the second end surface are integrally formed to the hollow cylindrical body and the other of the second end surface or first end surface is separately formed from the hollow cylindrical body and is coupled to the hollow cylindrical body. In addition, in other implementations in which one or both end surfaces are separately formed and coupled to the cylindrical body, the end surface(s) may be coupled by fasteners, adhesive, soldering, or any other suitable method of coupling.

The tire 3350 is fixedly coupled and disposed on the external surface 3340 of the hollow cylindrical body 3330. The tire 3350 in the implementation shown in FIGS. 15-17 includes an airless tire 3352 that defines a plurality of tire openings 3354 that are configured to deform while in use to absorb the force from the ground and cushion the ride of the electrical skateboard 3000. The tire openings 3354 extend along axes that are parallel to a central axis of the tire. The tire 3350 also includes an external surface 3356 that defines a plurality of square treads 3358. In other implementations, the tire includes a pneumatic tire or any suitable tire. Also, in other implementations, the external surface of the tire defines any suitable shape of tread or is treadless.

Figure 15:
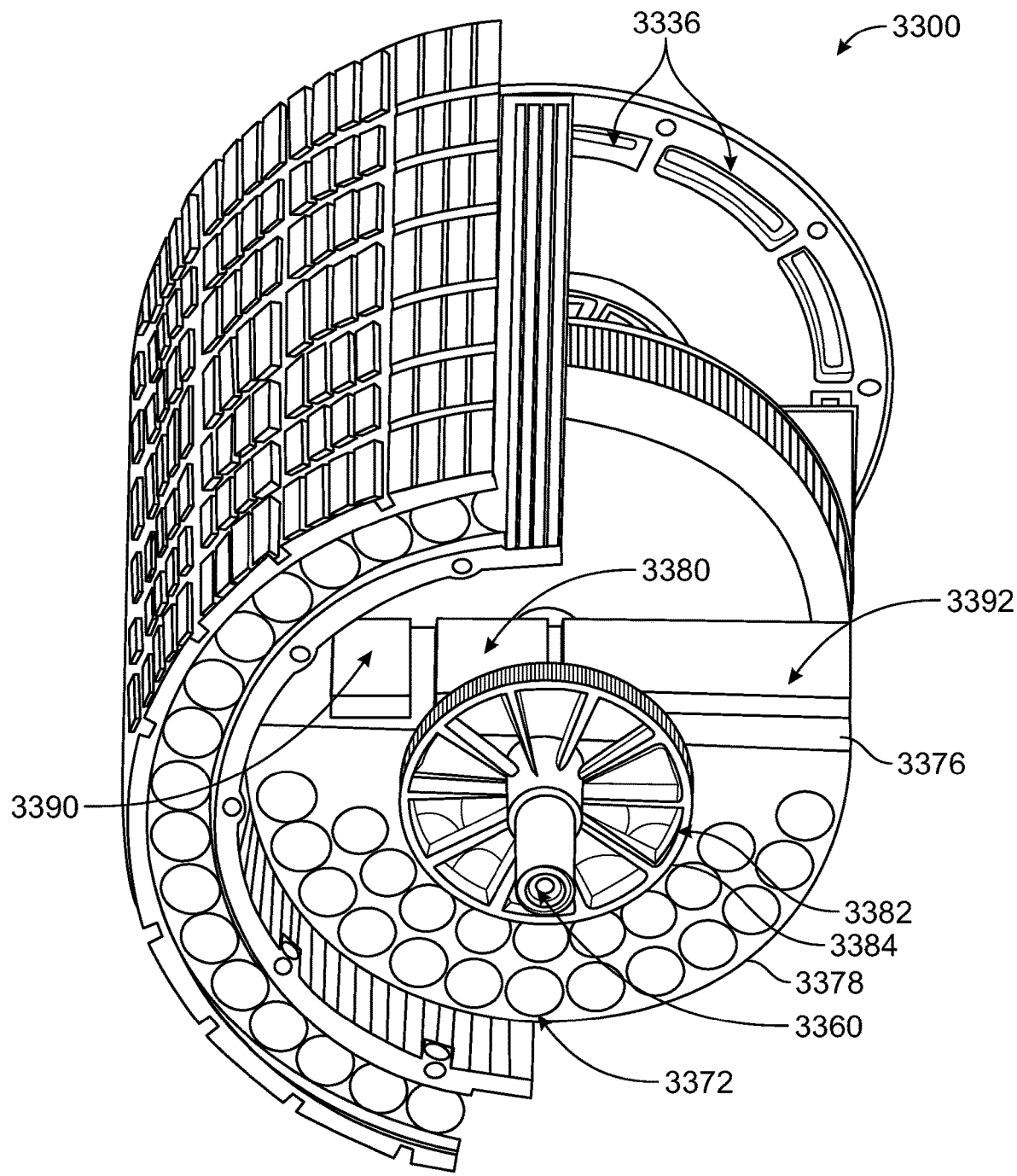
FIG. 15 is a partial cross section view of a wheel hub of the electric skateboard of FIG. 11.
Figure 16:
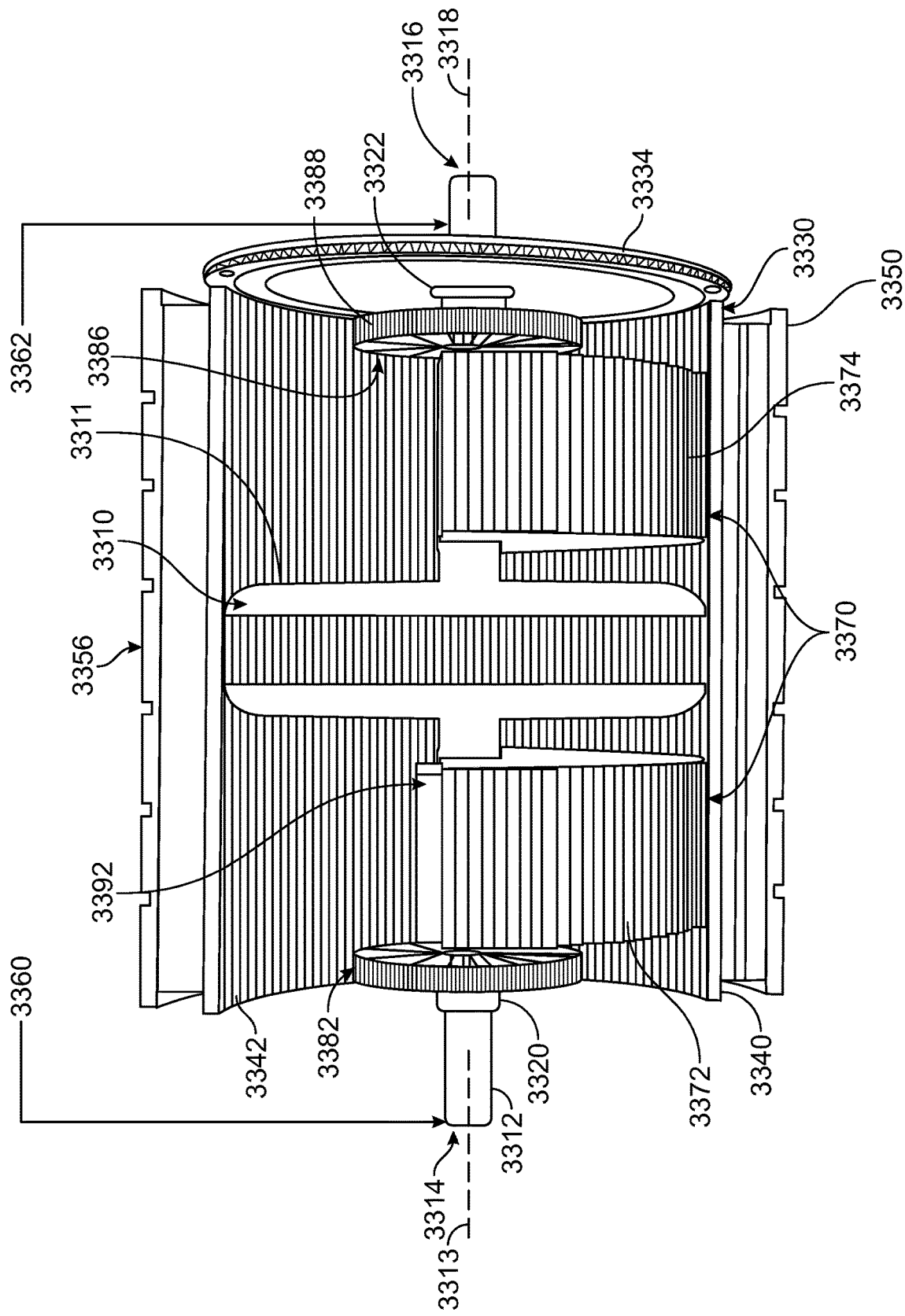
FIG. 16 a side view of the cross section shown in FIG. 15 of the electric skateboard of FIG. 11.

The direct drive motor 3310 includes a tubular motor body 3311 and central axis 3313 and is disposed within the hollow cylindrical body 3330 as shown in FIGS. 15 and 16. An external surface 3315 of the tubular motor body 3311 is fixedly coupled to the inner surface 3342 of the hollow cylindrical body 3330 such that rotation of the motor 3310 causes rotation of the hollow cylindrical body 3330 about the central axis 3313 of the motor 3310. As shown in FIG. 16, the motor 3310 is disposed within the hollow cylindrical body 3330 such that the motor 3310 is equally spaced from the first end surface 3332 and the second end surface 3334 of the hollow cylindrical body 3330 to balance the wheel hub 3300. However, in other implementations, the motor is disposed within the hollow cylindrical body such that it is unequally spaced between the first end surface and the second end surface of the hollow cylindrical body. In the implementation shown in FIGS. 11-17, the motor has a power of 1.4 kW and a torque of 75 Nm. In other implementations, the motor has a power in the range of 750 W to 2 kW and a torque in the range of 10 Nm to 75 Nm.

The hollow axle 3312 includes a central axis 3318, a first end 3314, and a second end 3316 spaced apart from the first end 3314 along the central axis 3318. The hollow axle 3312 is partially disposed within the cylindrical body 3330 through the axle openings 3338 defined by the first end surface 3332 and the second end surface 3334 of the cylindrical body 3330 such that the central axis 3318 of the hollow axle 3312 is coaxial with the motor central axis 3313 and such that the first end 3314 and second end 3316 of the hollow axle 3312 are disposed outside the hollow cylindrical body 3330. The hollow axle 3312 also extends through the tubular motor body 3311 of the direct drive motor 3310 as shown in FIG. 16.

The wheel hub 3300 further includes a first bearing 3320 and a second bearing 322 that are each watertight and disposed around the hollow axle 3312 between the hollow axle 3312 and the respective axle openings 3338. The bearings 3320, 3322 keep the axle 3312 stationary and allow the first end surface 3332 and the second end surface 3334 of the hollow cylindrical body 3330 to rotate about the hollow axle 3312.

The hollow axle 3312 of one of the wheel hubs 3300 of the electrical skateboard 3000 includes a power button 3360 and a charge port 3362. The power button 3360 is disposed within the first end 3314 of the hollow axle 3312 and is in electrical communication with the direct drive motor 3310 of both of the wheel hubs 3300 of the electric skateboard 3000. The power button 3360 is configured to turn the direct drive motor 3310 of both of the wheel hubs 3300 on or off. The charge port 3362 is disposed within the second end 3316 of the hollow axle 3312 that includes the power button 3360 and is in electrical communication with the battery 3370 of both of the wheel hubs 3300. Both the power button 3360 and charge port 3362 are disposed within the hollow axle 3312 with sealant such that the hollow axle 3312 is watertight. In some implementations, the charge port further includes a resilient stopper that can be removably disposed within the charge port during use to ensure that the charge port is watertight.

The hollow axle 3312 of the other of the wheel hubs 3300 of the electrical skateboard 3000 includes a first and a second resilient stopper 3364, 3366 attached with sealant such that the wheel hub 3300 is watertight.

The resilient stoppers 3364, 3366 may be formed of rubber or another suitable resilient material.

In other implementations, a resilient cap and/or sealant may be disposed around each end of the axle to provide watertightness.

The battery 3370 includes a first battery 3372 and a second battery 3374 that are in electrical communication with the direct drive motor 3310. Each battery 3372, 3374 has a semi annular shaped cross section as viewed in a plane that is perpendicular to the central axis 3313 of the motor 3310. Each battery 3372, 3374 has a flat surface 3376 and a curved surface 3378, and each battery 3372, 3374 is disposed within the hollow cylindrical body 3330 such that at least a portion of the curved surface 3378 is adjacent a portion of the inner surface 3342 of the hollow cylindrical body 3330. Specifically, the first battery 3372 is disposed between the first end surface 3332 of the cylindrical body 3330 and the direct drive motor 3310, and the second battery 3374 is disposed between the second end surface 3334 and the direct drive motor 3310. Both the first battery 3372 and the second battery 3374 are fixedly attached to the hollow axle 3312 with 5 mm hex head bolts. Along with the hollow axle 3312, the first battery 3372 and the second battery 3374 remain stationary while the skateboard 3000 is in use i.e. when the direct drive motor 3310 and hollow cylindrical body 3330 are rotating.

Although each wheel hub 3300 shown in FIGS. 15 and 16 includes two batteries 3372, 3374, in other implementations, the battery includes one or more batteries. Although both batteries 3372, 3374 shown in FIGS. 15 and 16 have semi-annular shaped cross sections as viewed in the plane that is perpendicular to the central axis 3313 of the motor 3310, in other implementations, the one or more batteries have an annular shaped cross section as viewed in the plane that is perpendicular to the central axis of the motor or any suitable shaped cross section as viewed in the plane that is perpendicular to the central axis of the motor.

The battery 3370 further includes a battery management system 3380 coupled to the flat surface 3376 of the first battery 3372 and is in electrical communication with the first battery 3372 and the second battery 3374. However, in other implementations, the battery management system is coupled to the flat surface of the second battery or in any suitable location within the hollow cylindrical body such that the battery management system is in electrical communication with the first battery and the second battery.

Figure 17:
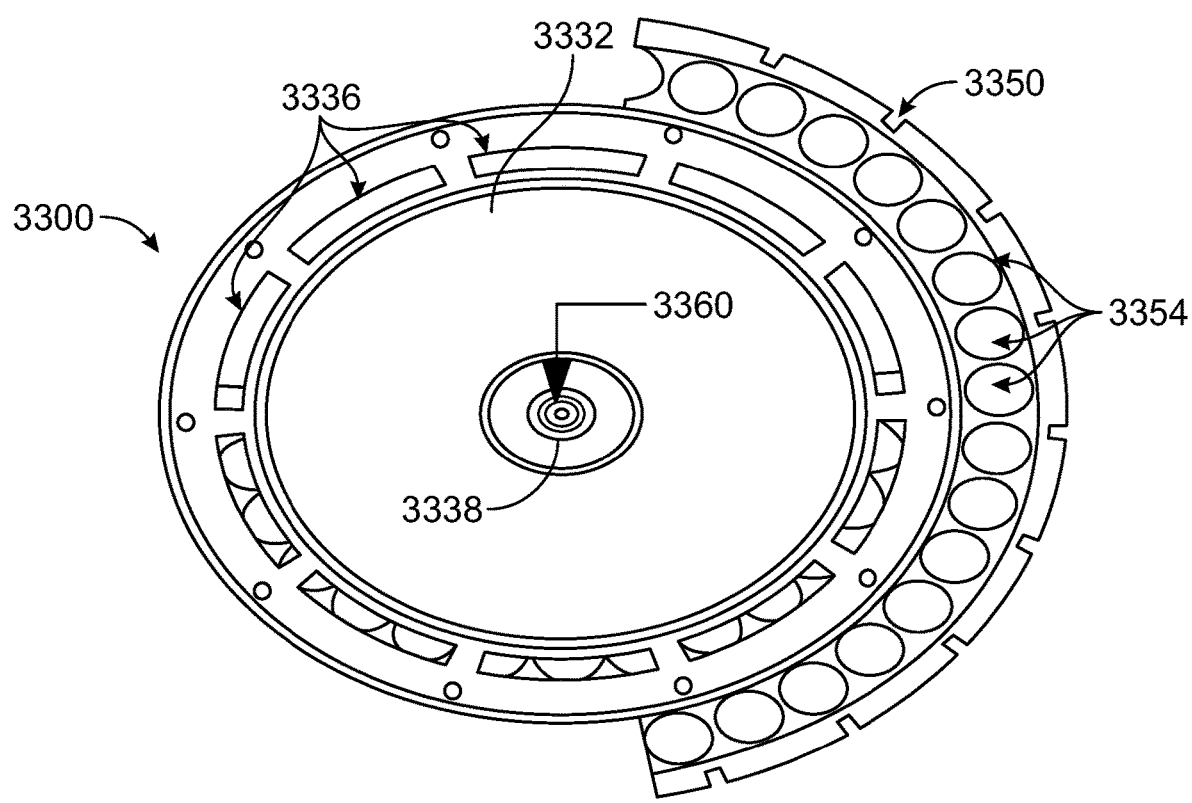
FIG. 17 is a front view of the cross section shown in FIG. 15 of the electric skateboard of FIG. 11.

The wheel hub 3300 of FIGS. 15-17 further include a first set of LEDs 3382 coupled to a first LED plate 3384 and a second set of LEDs 3386 coupled to a second LED plate 3388. The first LED plate 3382 is fixedly coupled to the hollow axle 3312 between the first end surface 3332 of the hollow cylindrical body 3330 and the first battery 3372. The second LED plate 3388 is fixedly coupled to the hollow axle 3312 between the second end surface 3334 of the hollow cylindrical body 3330 and the second battery 3374. The first LED plate 3382 is disposed such that the first set of LEDs 3382 are visible through at least one of the plurality of windows 3336 of the first end surface 3332, and the second LED plate 3388 is disposed such that the second set of LEDs 3386 are visible through at least one of the plurality of windows 3336 of the second end surface 3334.

The wheel hub 3300 further includes an LED controller 3390 disposed within the hollow cylindrical body 3330. The LED controller 3390 is in electrical communication with the first and second set of LEDs 3382, 3386. In some implementations, the LED controller is capable of changing the color and/or pattern of the first set or second set of LEDs.

The wheel hub 3300 further includes a remote control receiver 3392 disposed within the hollow cylindrical body 3330. The remote control receiver 3392 is in electrical communication with the direct drive motor 3310 and is capable of receiving instruction from a remote control or external radio frequency (RF) controller (not shown). In some implementations, the remote control receiver is capable of changing the speed of the direct drive motor and/or turning the wheel hub on or off after receiving instructions to do so from a remote control or external RF controller. In some implementations, the RF receiver is a Bluetooth receiver, and the remote control is a Bluetooth remote controller.

The trucks 3100 of the electric skateboard 3000 shown in FIGS. 11-14 are similar to the trucks 2100 shown in FIGS. 9 and 10 in that the trucks 3100 of the electric skateboard 3000 shown in FIGS. 11-14 include shock absorbers 3600. However, the trucks 3100 of the electric skateboard 3000 shown in FIGS. 11-14 are coupled to the bottom surface 3406 of the board 3400 as opposed to the top surface of the board. Furthermore, the trucks 3100 of the electric skateboard shown in FIGS. 11-14 further include a truck set of LEDs 3160 and an ornamental cover 3170. The truck set of LEDS 3160 are disposed along the brace 3246 of the truck 3100, and the ornamental cover 3170 is disposed along the surface 3172 of the truck 3100 opposite the tire 3350.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A wheel hub configured to be used with an electric vehicle, the wheel hub comprising:
    a hollow cylindrical body comprising a first end surface and a second end surface that is axially opposite and spaced apart from the first end surface;
    a direct drive motor disposed within the hollow cylindrical body, the motor configured to rotate the cylindrical body about a central axis of the motor;
    a hollow axle having a central axis that is coaxial with the motor central axis and is at least partially disposed within the cylindrical body;
    a battery disposed within the hollow cylindrical body, wherein the battery is in electrical communication with the direct drive motor; and
    a tire fixedly coupled and disposed on an external surface of the hollow cylindrical body.

2. The wheel hub of claim 1, wherein the cylindrical body is watertight.

3. The wheel hub of claim 1, further comprising a power button, the button being disposed within a first end of the hollow axle, the button being in electrical communication with the direct drive motor and is configured to turn the direct drive motor on or off.

4. The wheel hub of claim 1, further comprising a charge port, the charge port being disposed within a second end of the hollow axle, the charge port being in electrical communication with the battery.

5. The wheel hub of claim 1, wherein the hollow cylindrical body comprises an inner surface, and the battery is disposed within the hollow cylindrical body such that a portion of the battery is adjacent a portion of the inner surface.

6. The wheel hub of claim 1, wherein the battery comprises a first battery and a second battery, the first battery being disposed between the first end surface of the cylindrical body and the direct drive motor, and the second battery being disposed between the second end surface and the direct drive motor.

7. The wheel hub of claim 6, wherein the hollow cylindrical body comprises an inner surface, and the first battery and second battery have a semi annular shaped cross section as viewed in a plane that is perpendicular to the central axis of the motor, each of the first and the second battery has a flat surface and a curved surface, wherein the first battery and the second battery are disposed within the hollow cylindrical body such that at least a portion of the curved surfaces of the first battery and the second battery are adjacent a portion of the inner surface.

8. The wheel hub of claim 7, wherein the battery further comprises a battery management system, the battery management system being coupled to the flat surface of the first battery and/or the second battery.

9. The wheel hub of claim 1, further comprising a remote control receiver disposed within the hollow cylindrical body, the remote control receiver being in electrical communication with the direct drive motor.

10. The wheel hub of claim 1, wherein the tire comprises an airless tire.

11. The wheel hub of claim 1, wherein the first end surface and/or the second end surface defines a plurality of windows, and the wheel hub further comprising LED lights disposed within the hollow cylindrical body such that the LED lights are visible through at least one of the plurality of windows.

12. The wheel hub of claim 11, wherein the LED lights comprise a first set of LED lights and a second set of LED lights, the first set of LED lights being disposed within the hollow cylindrical body and adjacent the windows defined in the first end surface, and the second set of LED lights being disposed within the hollow cylindrical body adjacent the windows defined in the second end surface.

13. The wheel hub of claim 12, wherein the first set of LED lights comprises a first plate, and the second set of LED lights comprises a second plate, the first and second plate being disposed on the hollow axle.

14. An electric skateboard system, the system comprising:
a first wheel hub and a second wheel hub, each comprising:
a hollow cylindrical body comprising a first end surface and a second end surface that is axially opposite and spaced apart from the first end surface;
a direct drive motor disposed within the hollow cylindrical body, the motor configured to rotate the cylindrical body about a central axis of the motor;
a hollow axle having a central axis that is coaxial with the motor central axis and is at least partially disposed within the cylindrical body;
a battery disposed within the hollow cylindrical body, wherein the battery is in electrical communication with the direct drive motor; and
a tire fixedly coupled and disposed on an external surface of the hollow cylindrical body;
a board having a longitudinal axis, a first end and a second end opposite and spaced apart from the first end along the longitudinal axis,
wherein the first wheel hub is coupled to the board adjacent the first end of the board, and the second wheel hub is coupled to the board adjacent the second end of the board,
wherein the first wheel hub is in electrical communication with the second wheel hub, and
wherein the first wheel hub and the second wheel hub are watertight.

15. The system of claim 14, wherein the system further comprises an RF receiver.

16. The system of claim 15, further comprising a remote control, the remote control being configured to communication with the RF receiver to power the first wheel hub and/or second wheel hub on/off and/or change the speed of the direct drive motor of the first wheel hub and/or second wheel hub.

17. The system of claim 16, wherein the RF receiver is a Bluetooth receiver, and the remote control is a Bluetooth remote control.

18. The system of claim 14, further comprising a power button, the button being disposed within a first end of the hollow axle of the first wheel hub or the second wheel hub, the button being in electrical communication with the direct drive motor of the first wheel hub or the second wheel hub and is configured to turn the direct drive motor of the first wheel hub or the second wheel hub on or off.

19. The system of claim 14, further comprising a charge port, the charge port being disposed within a first end or a second end of the hollow axle of the first wheel hub or the second wheel hub and in electrical communication with the battery of the first wheel hub and the battery of the second wheel hub.

20. The system of claim 14, wherein the tire of the first wheel hub comprises an airless tire, and wherein the tire of the second wheel hub comprises an airless tire.

\* \* \* \* \*